United States Patent
Singh et al.

(10) Patent No.: US 12,517,720 B1
(45) Date of Patent: Jan. 6, 2026

(54) SYSTEM AND METHOD FOR IMPROVED WEB PLATFORM

(71) Applicant: Morgan Stanley Services Group Inc., New York, NY (US)

(72) Inventors: Gurmeet Singh, New Delhi (IN); Mukesh Kumar, New York, NY (US); Ankur Mongia, New York, NY (US); Rajesh Natarajan, New York, NY (US); Scott H. Logan, Robbinsville, NJ (US); David Magoloff, Wantagh, NY (US)

(73) Assignee: Morgan Stanley Services Group Inc., New York, NY (US)

( * ) Notice: Subject to any disclaimer, the term of this patent is extended or adjusted under 35 U.S.C. 154(b) by 0 days.

(21) Appl. No.: 19/249,502

(22) Filed: Jun. 25, 2025

(51) Int. Cl.
G06F 9/44 (2018.01)
G06F 8/65 (2018.01)

(52) U.S. Cl.
CPC .................... G06F 8/65 (2013.01)

(58) Field of Classification Search
CPC ..... G06F 8/65; G06F 8/71; G06F 8/61; G06F 8/60; G06F 9/44505; G06F 8/658; G06F 9/44521; H04L 67/125
See application file for complete search history.

(56) References Cited

U.S. PATENT DOCUMENTS

| | | |
|---|---|---|
| 7,895,296 B1 | 2/2011 | Dayan |
| 8,914,813 B1 | 12/2014 | Sigurdsson et al. |
| 9,342,386 B1 | 5/2016 | Sargent |
| 9,769,258 B1 | 9/2017 | Kay |
| 2008/0184157 A1 | 7/2008 | Selig |
| 2014/0245124 A1 | 8/2014 | Gonzalez |
| 2015/0089577 A1* | 3/2015 | Beckman ............ H04L 63/02 726/1 |
| 2015/0222512 A1 | 8/2015 | Kay et al. |
| 2017/0131856 A1 | 5/2017 | Reyes et al. |
| 2017/0177320 A1* | 6/2017 | Sreedharan .......... H04L 67/02 |
| 2023/0038988 A1 | 2/2023 | Freund et al. |

* cited by examiner

*Primary Examiner* — Chuck O Kendall
(74) *Attorney, Agent, or Firm* — PEARL COHEN ZEDEK LATZER BARATZ LLP

(57) ABSTRACT

A method and system for providing functionality of a desktop container having a plurality of applications using a modified web browser extension. A request for service requiring communication between at least two applications of the plurality of applications can be received. A web page content script associated with the request can be executed, and a message type and data to be retrieved can be transmitted to the modified web browser extension through the modified web browser extension application interface. The modified web browser extension can retrieve the data for the service request, execute a modified web browser extension content script that includes a plurality of actions based on the message type and transmit through the modified web browser extension application interface, an event for execution to the web browser, wherein the event is based on the modified web browser extension content script to achieve the service request.

10 Claims, 3 Drawing Sheets

SYSTEM AND METHOD FOR IMPROVED WEB PLATFORM

TECHNICAL FIELD OF THE INVENTION

In general, the invention relates to improving web platforms. In particular, the invention relates to allowing a web browser extension to provide the functionality of a desktop container.

BACKGROUND OF THE INVENTION

Currently, computing systems that include many desktop applications typically run within a dedicated container (e.g., thick client). As is known in the art, the dedicated container can be a standardized unit of software that packages applications to run consistently across different environments. Each time a change (e.g., update) is made (e.g., a security update, a change to the application) it can require the change be made and testing be performed across all of the applications. This can be on the order of hundreds of applications.

Updates to the underlying browser engine (e.g., Chromium Embedded Framework) can be made (e.g., daily, weekly, monthly) requiring an unrealistic amount of work to get the desktop applications and container updated and tested. The updates can be faster then they can be implemented, such that the system may never truly be up to date.

One difficulty can be that manual updates, e.g., updating on the local desktop, can require downloading and running an installer.

Due to the complexity of making updates, it can be common to hold the updates and then make them all at once, causing the systems to have a period of non-compliance with the updates. If the updates are security related, for example, holding the updates can pose a security risk. If there are many updates, it can require user training in order to integrate many changes at once.

Therefore, it can be desirable to provide container functionality for multiple application that allows for real-time updates.

SUMMARY OF THE INVENTION

Advantages of the invention can include an allowing multiple applications to run in an easily updated environment, eliminating the need to download and run installers to make updates, less frequent updates to the desktop, more current environment due to updates being able to be made when the change is made.

Advantages of the invention can also include providing an intuitive browser based experience, consumption of fewer system resources and/or negligible memory leaks due to, for example, running under the browser the method can be centralized and/or use browser optimizations, and/or automatic browser updates.

Another advantage of the invention can include increased security due to for example applications running on latest security updates.

In one aspect, the invention involves a method for providing functionality of a desktop container having a plurality of applications using a modified web browser extension. The method can involve receiving, at a web browser on a computing device, a request from a user for service, wherein the service requires communication between at least two applications of the plurality of applications. The method can involve executing, by the web browser, a web page content script that is associated with the service request, wherein the web page content script indicates a message type for the service request and data to be retrieved for the service request. The method can involve transmitting, by the web browser, the message type and the data to be retrieved for the service request to a modified web browser extension through a modified web browser extension application interface. The method can involve receiving, by the modified web browser extension, the message type and data to be retrieved for the service request. The method can involve retrieving, by the modified web browser extension, the data to be retrieved for the service request. The method can involve executing, by the modified web browser extension, a modified web browser extension content script that includes a plurality of actions based on the message type, wherein the plurality of actions includes interacting with at least one of the two applications of the plurality of applications. The method can involve transmitting, by the modified web browser extension, through the modified web browser extension application interface, an event for execution to the web browser, wherein the event is based on the modified web browser extension content script to achieve the service request.

In some embodiments, the received message indicates a new application to be accessed. In some embodiments, the message type is one of a plurality of predefined message types. In some embodiments, the web browser further transmits a user profile and user preferences to the modified web browser extension.

In some embodiments, the method involves receiving, by the modified web browser extension, a message from a user notification system to be transmitted to the web browser and transmitting, by the modified web browser extension, the message to all open webpages on the computing device, wherein each open webpage determines whether the message applies or not.

In another aspect, the invention includes a system for providing functionality of a desktop container having a plurality of applications using a modified web browser extension. The system includes a memory. The system includes a processor configured to receive, at a web browser, a request from a user for service, wherein the service requires communication between at least two applications of the plurality of applications. The processor is also configured to execute, by the web browser, a web page content script that is associated with the service request, wherein the web page content script indicates a message type for the service request and data to be retrieved for the service request. The processor is also configured to transmit, by the web browser, the message type and the data to be retrieved for the service request to a modified web browser extension through a modified web browser extension application interface. The processor is also configured to receive, by the modified web browser extension, the message type and data to be retrieved for the service request. The processor is also configured to retrieve, by the modified web browser extension, the data to be retrieved for the service request. The processor is also configured to execute, by the modified web browser extension, a modified web browser extension content script that includes a plurality of actions based on the message type, wherein the plurality of actions includes interacting with at least one of the two applications of the plurality of applications. The processor is also configured to transmit, by the modified web browser extension, through the modified web browser extension application interface, an event for execution to the web browser, wherein the event is based on the modified web browser extension content script to achieve the service request.

In some embodiments, the received message indicates a new application to be accessed. In some embodiments, the message type is one of a plurality of predefined message types. In some embodiments, the web browser further transmits a user profile and user preferences to the modified web browser extension.

In some embodiments, the processor is further configured to receive, by the modified web browser extension, a message from a user notification system to be transmitted to the web browser, and transmit, by the modified web browser extension, the message to all open webpages on the computing device, wherein each open webpage determines whether the message applies or not.

These, additional, and/or other aspects and/or advantages of the present invention may be set forth in the detailed description which follows; possibly inferable from the detailed description; and/or learnable by practice of the present invention.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
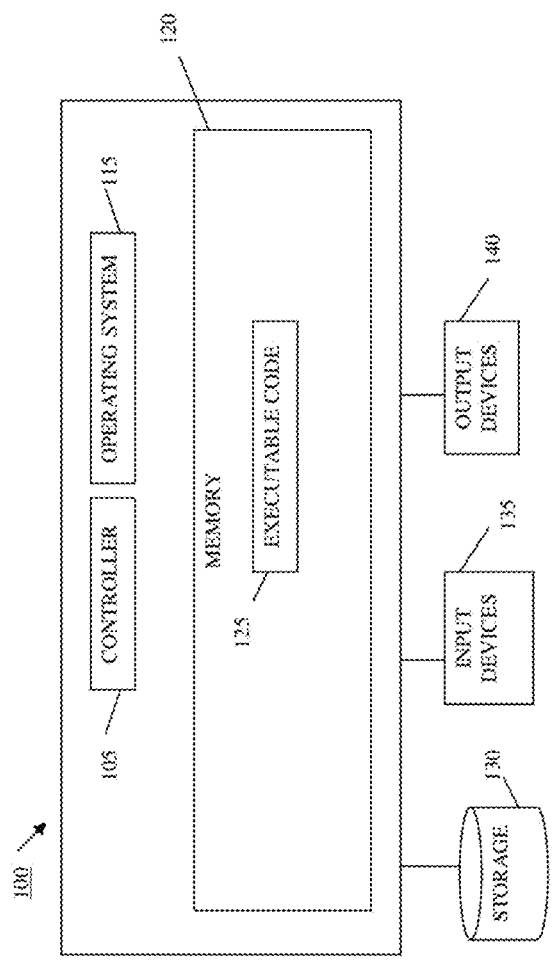
FIG. 1 shows a block diagram of an exemplary computing device which may be used with embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Before at least one embodiment of the invention is explained in detail, it is to be understood that the invention is not limited in its application to the details of construction and the arrangement of the components set forth in the following description or illustrated in the drawings. The invention is applicable to other embodiments that may be practiced or carried out in various ways as well as to combinations of the disclosed embodiments. Also, it is to be understood that the phraseology and terminology employed herein is for the purpose of description and should not be regarded as limiting.

Unless specifically stated otherwise, as apparent from the following discussions, it is appreciated that throughout the specification discussions utilizing terms such as "processing", "computing", "calculating", "determining", "enhancing" or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices. Any of the disclosed modules or units may be at least partially implemented by a computer processor.

As used herein, "machine learning", "machine learning algorithms", "machine learning models", "ML", or similar, may refer to models built by algorithms in response to/based on input sample or training data. ML models may make predictions or decisions without being explicitly programmed to do so. ML models require training/learning based on the input data, which may take various forms.

ML models may, for example, include Large Language Models (LLM) such as Generative Pre-Trained Transformer (GPT), Bidirectional Encoder Representations from Transformers (BERT), Pathways Language Model (PaLM) and the like, (artificial) neural networks (NN), decision trees, regression analysis, Bayesian networks, Gaussian networks, genetic processes, etc. Additionally, or alternatively, ensemble learning methods may be used which may use multiple/modified learning algorithms, for example, to enhance performance. Ensemble methods, may, for example, include "Random forest" methods or "XGBoost" methods.

Neural networks (NN) (or connectionist systems) are computing systems inspired by biological computing systems but operating using manufactured digital computing technology. NNs are made up of computing units typically called neurons (which are artificial neurons or nodes, as opposed to biological neurons) communicating with each other via connections, links or edges. In common NN implementations, the signal at the link between artificial neurons or nodes can be for example a real number, and the output of each neuron or node can be computed by function of the (typically weighted) sum of its inputs, such as a rectified linear unit (RcLU) function. NN links or edges typically have a weight that adjusts as learning proceeds. The weight increases or decreases the strength of the signal at a connection. Typically, NN neurons or nodes are divided or arranged into layers, where different layers can perform different kinds of transformations on their inputs and can have different patterns of connections with other layers. NN systems can learn to perform tasks by considering example input data, generally without being programmed with any task-specific rules, being presented with the correct output for the data, and self-correcting, or learning.

Various types of NNs exist. For example, a convolutional neural network (CNN) can be a deep, feed-forward network, which includes one or more convolutional layers, fully connected layers, and/or pooling layers. CNNs are particularly useful for visual applications. Other NNs can include for example transformer NNs, useful for speech or natural language applications, and long short-term memory (LSTM) networks.

Typical NNs can require that nodes of one layer depend on the output of a previous layer as their inputs. Current systems typically proceed in a synchronous manner, first typically executing all (or substantially all) of the outputs of a prior layer to feed the outputs as inputs to the next layer. Each layer can be executed on a set of cores synchronously (or substantially synchronously), which can require a large amount of computational power, on the order of 10s or even 100s of Teraflops, or a large set of cores. On modern GPUs this can be done using 4,000-5,000 cores.

It will be understood that any subsequent reference to "machine learning", "machine learning algorithms", "machine learning models", "ML", or similar, may refer to any/all of the above ML examples, as well as any other ML models and methods as may be considered appropriate.

FIG. 1 shows a high-level block diagram of an exemplary computing device which may be used with embodiments of the present invention. Computing device 100 may include a controller or processor 105 that may be, for example, a central processing unit processor (CPU), a chip or any suitable computing or computational device, an operating system 115, a memory 120, a storage 130, input devices 135 and output devices 140 such as a computer display or monitor displaying for example a computer desktop system. Each of modules, methods and equipment and other devices and modules discussed herein, may be or include, or may be executed by, a computing device such as included in FIG. 1 although various units among these modules may be combined into one computing device.

Operating system 115 may be or may include any code segment designed and/or configured to perform tasks involving coordination, scheduling, arbitration, supervising, controlling or otherwise managing operation of computing device 100, for example, scheduling execution of programs. Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 120 may be or may include a plurality of, possibly different memory units. Memory 120 may store for example, instructions (e.g. code 125) to carry out a method as disclosed herein, and/or data.

Executable code 125 may be any executable code, e.g., an application, a program, a process, task or script. Executable code 125 may be executed by controller 105 possibly under control of operating system 115. For example, executable code 125 may be one or more applications performing methods as disclosed herein, for example those of FIG. 2 or other figures, or other methods, according to embodiments of the present invention. In some embodiments, more than one computing device 100 or components of device 100 may be used for multiple functions described herein. For the various modules and functions described herein, one or more computing devices 100 or components of computing device 100 may be used. Devices that include components similar or different to those included in computing device 100 may be used, and may be connected to a network and used as a system. One or more processor(s) 105 may be configured to carry out embodiments of the present invention by, for example, executing software or code. Storage 130 may be or may include, for example, a hard disk drive, a floppy disk drive, a Compact Disk (CD) drive, a CD-Recordable (CD-R) drive, a universal serial bus (USB) device or other suitable removable and/or fixed storage unit. Data may be stored in a storage 130 and may be loaded from storage 130 into a memory 120 where it may be processed by controller 105. In some embodiments, some of the components shown in FIG. 1 may be omitted.

Input devices 135 may be or may include a mouse, a keyboard, a touch screen or pad or any suitable input device. It will be recognized that any suitable number of input devices may be operatively connected to computing device 100 as shown by block 135. Output devices 140 may include one or more displays, speakers and/or any other suitable output devices. It will be recognized that any suitable number of output devices may be operatively connected to computing device 100 as shown by block 140. Any applicable input/output (I/O) devices may be connected to computing device 100, for example, a wired or wireless network interface card (NIC), a modem, printer or facsimile machine, a universal serial bus (USB) device or external hard drive may be included in input devices 135 and/or output devices 140.

Embodiments of the invention may include one or more article(s) (e.g. memory 120 or storage 130) such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein.

In general, the invention involves providing the functionality of a desktop container by using a web browser with a modified web browser extension. Using a web browser instead of a desktop container can allow for automatic updates for all (or substantially all) the applications (apps). As is known in the art, a web browser extension is typically used for particular tasks (e.g., opening a tab and/or getting user preference passing data between tabs). Typically, each web browser provides a predetermined set of functions associated with predetermined messages available for its web browser extension. For example, a message type of EXTENSION_PREFERENCES_UPATE can indicate to the web browser extension that an app has made a preference change and that the preference change may need to be shared to all other opened apps across different tabs.

Figure 2:
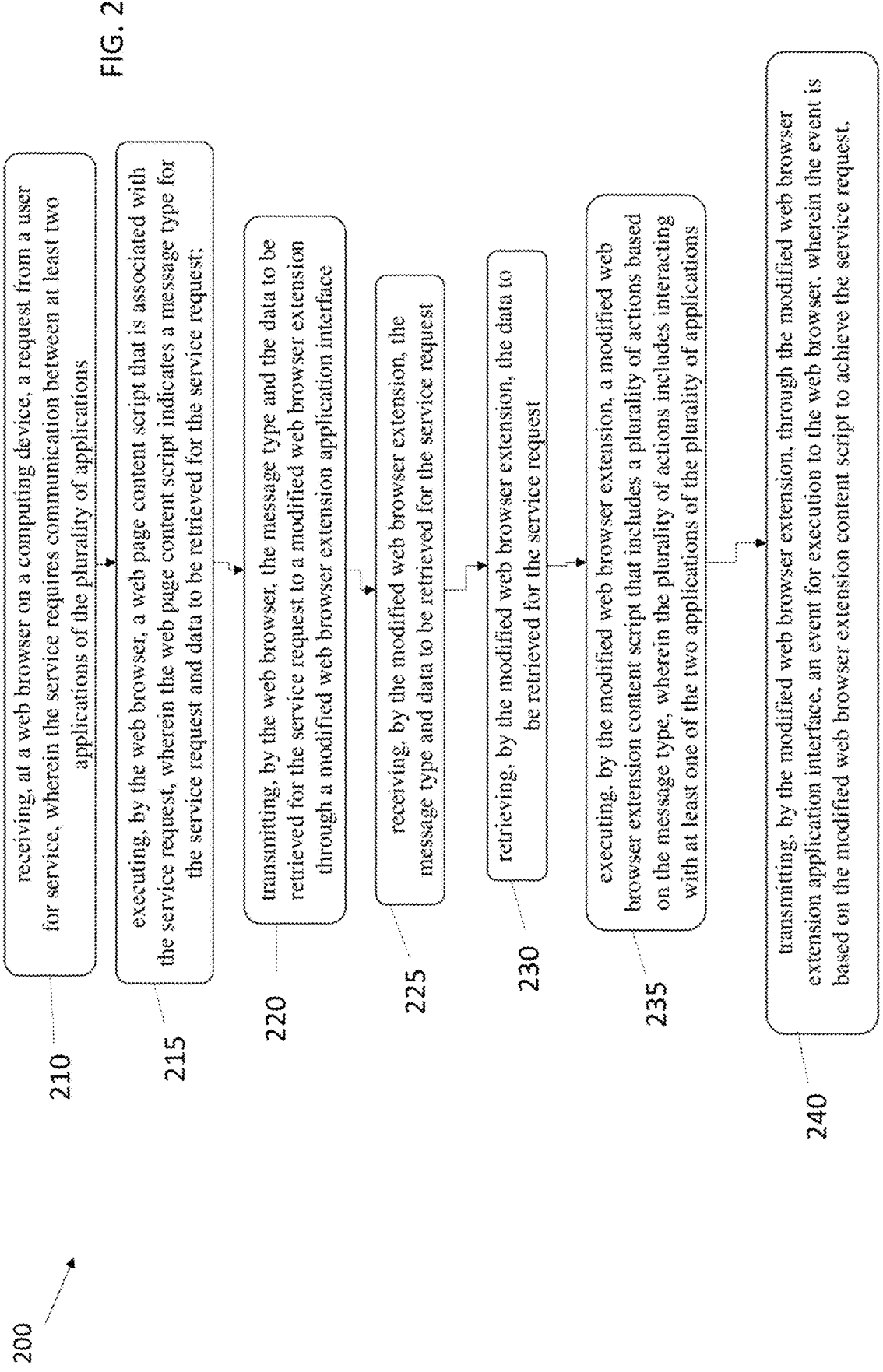
FIG. 2 is flowchart for providing functionality of a desktop container having a plurality of applications using a modified web browser extension, according to some embodiments of the invention.

FIG. 2 is a method for providing functionality of a desktop container having a plurality of applications using a modified web browser extension, according to some embodiments of the invention.

The method can involve receiving, at a web browser on a computing device, a request from a user for service, wherein the service requires communication between at least two applications of the plurality of applications (Step 210). The web browser can be Microsoft Edge.

The plurality of applications can be a web application user interface (UI) where user can search for a client account and/or other web applications that can show for example, a position of assets held by the respective client account. While using the UI, when a particular client account is selected via a first application, the UI can automatically navigate the user to a target application (e.g., one of the other web applications) that can display the position of the assets held. The target application and the first application can communicate via the modified web browser extension and can work seamlessly.

The request can be an alert that was generated by one of the plurality of applications. The alert can be an indicator that at least one application has a task to be executed (e.g., communicate with another application, or let users know that certain action has been performed, e.g., an order is executed such that an application may need to update its view). An alert can be received by a shared worker.

The method can also involve executing, by the web browser, a web page content script that is associated with the service request, wherein the web page content script indicates a message type for the service request and data to be retrieved for the service request (Step 215). The message type can be the message sent to the modified web browser extension. The message type to use for each service request can be based on a predetermined mapping between the message type and the messages of the modified web browser extension. The predetermined mapping can be based on a configuration file. For example, if a user clicks on a link (e.g., a link to show account balance) a new application that can display the account balance can open. The configuration file can indicate if the new application is to display the account balance in a window. In this example, the NEW_WINDOW message can be used.

The message type can be as shown in Table 1 below:

TABLE 1

| Message Type | Definition |
| --- | --- |
| NEW_WINDOW | Open the app in new tab |
| FOCUS_ON_CALLER | Open new app but keep the application which called for the new app open in a prior page in focus where new pp was launched |
| EXTENSION_PREFERENCES_UPATE | Notify all tabs that there is a update to user preferences in the modified web browser extension and that apps need to refresh a previously retrieved user preference |
| APPLICATION_PREFERENCES_UPDATE | Notify all tabs that there is an update to user preference in the application and that apps need to refresh a local copy of preference |
| NAVIGATE_OPEN_OR_FOCUS | Open a new app in a new tab or focus on a tab that is already opened. |
| GET_OPEN_INSTANCES | Find a list of all opened tabs |
| GET_OUTAGE_MESSAGE | Get a list of any outage message(s) to be shown on any apps |
| NAVIGATE_OPEN_OR_FOCUS_NAMED_POPUP | Open a new app in named (e.g., particular) window or focus on the named window if already opened. |
| NAVIGATE_OPEN_OR_RAISE_EVENT | Open a new app or trigger an event broadcast that other web applications are listening to. |
| GET_CURRENT_ENVIRONMENT | Get current environment (DEV, QA, PROD) |
| CLOSE_CURRENT_TAB | Tell the modified web browser extension to close the tab that sent the current message |
| IS_EXTENSION_AVAILABLE | Check if the modified web browser extension is available to send messages. |
| GET_EXTENSION_VERSION | Get a version of the modified web browser extension running. |
| RTA_POPUP_ACTION | Action (e.g., updated text) like approved, reviewed, rejected etc taken on a real time alerts popup, that is passed to other application vi event broadcast |

The method can also involve transmitting, by the web browser, the message type and the data to be retrieved for the service request to a modified web browser extension through a modified web browser extension application interface (Step 220). The modified web browser extension can be the web browser extension that comes along with the web browser that is modified because the message type is different than the message types allowed by the unmodified web browser extension.

In this manner, the modified web browser extension can be used to execute functions that the desktop application of the prior art executed, and updates can be made without making a change to the application (e.g., code of the application).

The method can also involve receiving, by the modified web browser extension, the message type and data to be retrieved for the service request (Step 225).

The method can also involve retrieving, by the modified web browser extension, the data to be retrieved for the service request (Step 230). For example, when an app needs a user preference related to the app itself, the app can request the data via the api and the extension can retrieve the data from the backend service that is in communication with the other apps.

The method can also involve executing, by the modified web browser extension, a modified web browser extension content script that includes a plurality of actions based on the message type, wherein the plurality of actions includes interacting with at least one of the two applications of the plurality of applications (Step 235). For example, when an application aims to offer users an integrated experience by sharing its current data points with another app as the user navigates away, this can be achieved through a modified extension that facilitates the necessary integration.

The method can also involve transmitting, by the modified web browser extension, through the modified web browser extension application interface, an event for execution to the web browser, wherein the event is based on the modified web browser extension content script to achieve the service request (Step 240). For example, an app running in browser can request user preference(s) that can be saved for that app from a Unified desktop JavaScript API (UDJSAPI) (e.g., as described in further detail below). UDJSAPI can send the request to the modified web browser extension with a message of APPLICATION_PREFERENCES_UPDATE, and data that is app id and preference key name. The modified web browser extension can then call a web service which can obtain users preferences (e.g., default view, landing page and/or other preferences as are known in the art) to fetch that data and return same back to app.

Figure 3:
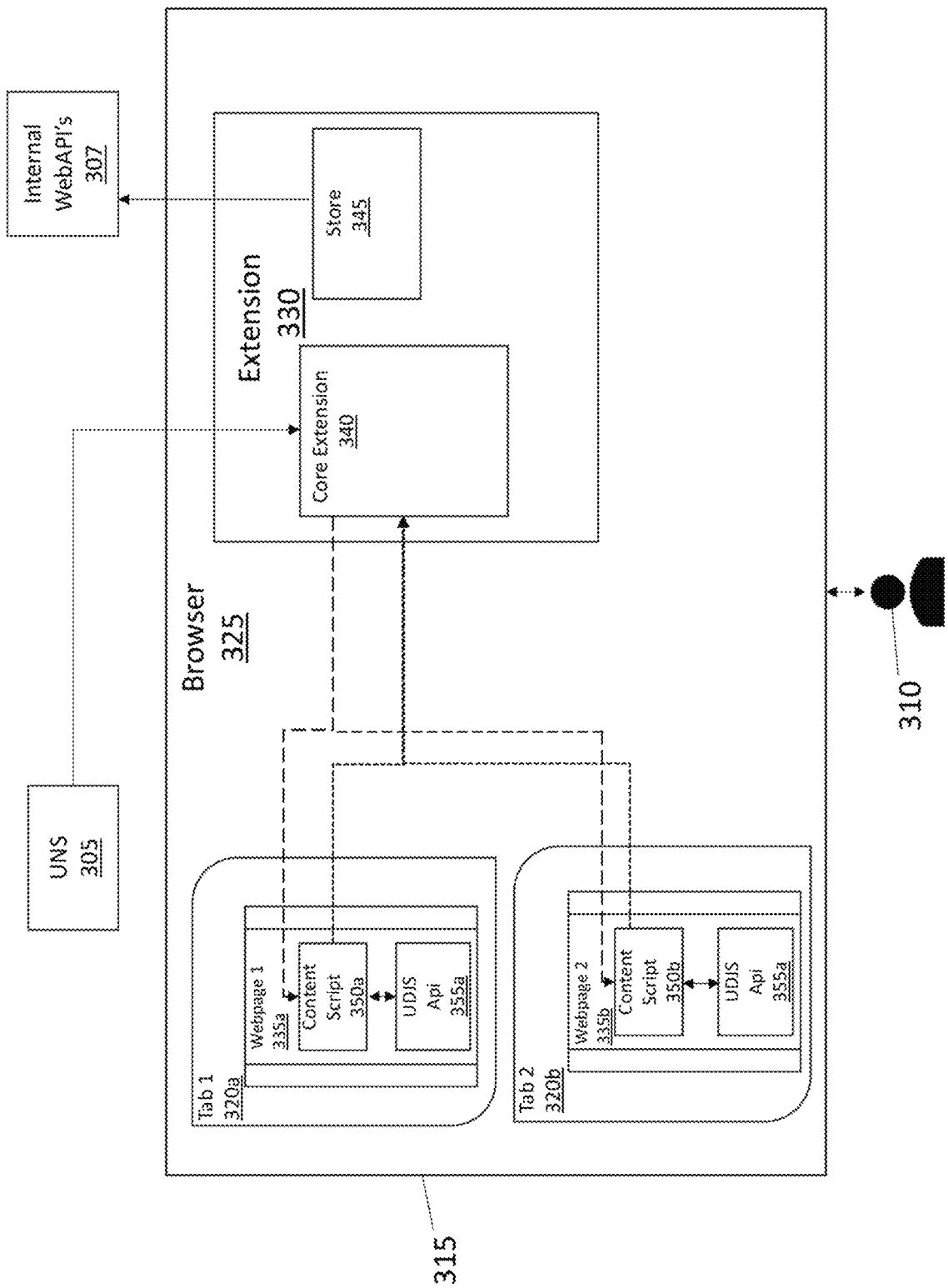
FIG. 3 is system for providing functionality of a desktop container having a plurality of applications using a modified web browser extension, according to some embodiments of the invention.

FIG. 3 is system for providing functionality of a desktop container having a plurality of applications using a modified web browser extension, according to some embodiments of the invention. The system can include a user notification system (UNS) 305, a browser 325, and an internal web application interface 307.

The browser 307 can include a modified web page browser extension 330 and a plurality of tabs, tab 1 320*a*, tab 2 320*b*, generally 320. Each tab can be opened by a user 310 and can be related to a respective application. For example, user can have an app for client investment portfolio and can other tab with for placing trading stocks and both can function independently still can share data with each other via modified web browser extension. The number of tabs shown in FIG. 3 are for example purposes only, and there can be more or less tabs depending on how many applications the user 310 opens.

Tab 1 320a can include webpage 1 335a and webpage 2 335b. Webpage 1 335a can include a content script 350a and a UDJSAPI 355a, and webpage 2 335b can include content script 350b and a UDJAPI 355b.

The modified web page browser extension 330 includes a core extension 340 and a storage 345.

During operation, the UNS 305 can send a message to the modified web browser extension 330 (e.g., something the user needs to be alerted about). The modified web browser extension 330 can send the message to all open tabs, in FIG. 3 tab 1 320a and tab 2 320b. Each application associated with each tab tab 1 320a and tab 2 320b can decide the reaction via the content scripts 35a and 350b, for example, the reaction can be opening a new tab or displaying something.

During operation, the user 310 can send requests for service to the webpages, webpage 1 335a or webpage 2 335b, which can be received by the respective content scripts 350a and 350b. The requests can have desired actions (e.g., retrieve data). The respective content scripts 350a and 350b can determine a respective message type to execute the desired actions. The message type can based on payload which contains the command that can be used to interpret the message type, and actual data that it can be used to perform the desired actions sent via postmesssage and predetermined list of message types (e.g., as specific in the configuration file) between web application and content script, 350 which is injected to web application by browser. When an application, e.g., the output of which is webpage 1 335a, sends a message to a content script (e.g., content script 350a or 350b) via postmessage, the application can also pass certain message type based on which content script and then application can pass the message having the message type to the modified web browser extension 330.

The content scripts 350a and 350b can communicate with the modified web browser extension 330. The communication can include a message of the determined message type. The message can include a small script to be executed by the modified web browser extension 330 to cause the action to occur. For example in some embodiments the message can indicate that a first application associated with tab 1 320a and a second application associate with tab 2 320b can share certain data elements. In this example, when there is information to be shared by tab 1, the respective content script 350a sends a message of a corresponding message type to the core extension 340 and then the core extension 340 based on the message type, sends the message to tab 2 320b via client script 350b. Client script 350b can raise an event (e.g., an alert that someone can subscribe to be notified about) which tab 2 320b app receives and can act or ignore the event based on the use case. Tab 1 320a can use UDJSAPI 355a exposed function that send message via Postmessage, which ca be received by the content script 350a. The content script 350a can pass that message to the core extension 340. The core extension 340 can send the message through a response message to the target tab (e.g., not shown, new window) via the content script, which can raise the specific event that is listened by UDJSAPI event handler. The event received by UDJSJS handler can perform the action for apps that had reference to UDJSAPI.

To make easy for apps to interact with extension, we have created a library with few function that does the heavy lifting of interacting with modified extension and providing features like page navigation, get users preference, share data between apps, get real time alerts etc. Apps add instance of the udjsapi file in their app and when this file loads it creates necessary connection with extension for app to function.

Core extension is the extension functionality provided by browser, the extension is the modified extension that is part of the invention.

For modified extension to function, needs certain data like configuration to render application menu, user specific profile, preference, favorites and entitlements. To get these data, we have created specific webapi's that fetch data from database and other services and return to extension.

Content script can act as a broker between web apps and extension. When modified extension starts, it can inject content script into the web pages. The web pages can then use postmessage or via runtime.sendmessage function, exposed via content script, to send message to extension. Extension can run a service worker that can handle all of the functionality of extension and handle the interaction with content script.

The aforementioned flowcharts and diagrams illustrate the architecture, functionality, and operation of possible implementations of systems, methods and computer program products according to various embodiments of the present invention. In this regard, each portion in the flowchart or portion diagrams may represent a module, segment, or portion of code, which comprises one or more executable instructions for implementing the specified logical function (s). It should also be noted that, in some alternative implementations, the functions noted in the portion may occur out of the order noted in the figures. For example, two portions shown in succession may, in fact, be executed substantially concurrently, or the portions may sometimes be executed in the reverse order, depending upon the functionality involved, It will also be noted that each portion of the portion diagrams and/or flowchart illustration, and combinations of portions in the portion diagrams and/or flowchart illustration, can be implemented by special purpose hardware-based systems that perform the specified functions or acts, or combinations of special purpose hardware and computer instructions.

As will be appreciated by one skilled in the art, aspects of the present invention may be embodied as a system or an apparatus. Accordingly, aspects of the present invention may take the form of an entirely hardware embodiment or an embodiment combining software and hardware aspects that may all generally be referred to herein as a "circuit," "module" or "system."

The aforementioned figures illustrate the architecture, functionality, and operation of possible implementations of systems and apparatus according to various embodiments of the present invention. Where referred to in the above description, an embodiment is an example or implementation of the invention. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions. It will further be recognized that the aspects of the invention described hereinabove may be combined or otherwise coexist in embodiments of the invention.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with materials equivalent or similar to those described herein.

While the invention has been described with respect to a limited number of embodiments, these should not be construed as limitations on the scope of the invention, but rather as exemplifications of some of the preferred embodiments. Other or equivalent variations, modifications, and applications are also within the scope of the invention. Accordingly, the scope of the invention should not be limited by what has thus far been described, but by the appended claims and their legal equivalents.

What is claimed is:

1. A method for providing functionality of a desktop container having a plurality of applications using a modified web browser extension, the method comprising:

receiving, at a web browser on a computing device, a request from a user for service, wherein the service requires communication between at least two applications of the plurality of applications;

executing, by the web browser, a web page content script that is associated with the service request, wherein the web page content script indicates a message type for the service request and data to be retrieved for the service request;

transmitting, by the web browser, the message type and the data to be retrieved for the service request to a modified web browser extension through a modified web browser extension application interface;

receiving, by the modified web browser extension, the message type and data to be retrieved for the service request;

retrieving, by the modified web browser extension, the data to be retrieved for the service request;

executing, by the modified web browser extension, a modified web browser extension content script that includes a plurality of actions based on the message type, wherein the plurality of actions includes interacting with at least one of the two applications of the plurality of applications; and transmitting, by the modified web browser extension, through the modified web browser extension application interface, an event for execution to the web browser, wherein the event is based on the modified web browser extension content script to achieve the service request.

2. The method of claim 1 wherein the received message indicates a new application to be accessed.

3. The method of claim 1 wherein the message type is one of a plurality of predefined message types.

4. The method of claim 1 wherein the web browser further transmits a user profile and user preferences to the modified web browser extension.

5. The method of claim 1 further comprising:

receiving, by the modified web browser extension, a message from a user notification system to be transmitted to the web browser; and transmitting, by the modified web browser extension, the message to all open webpages on the computing device, wherein each open webpage determines whether the message applies or not.

6. A system for providing functionality of a desktop container having a plurality of applications using a modified web browser extension, the system comprising:

a memory;

a processor configured to:

receive, at a web browser, a request from a user for service, wherein the service requires communication between at least two applications of the plurality of applications;

execute, by the web browser, a web page content script that is associated with the service request, wherein the web page content script indicates a message type for the service request and data to be retrieved for the service request;

transmit, by the web browser, the message type and the data to be retrieved for the service request to a modified web browser extension through a modified web browser extension application interface;

receive, by the modified web browser extension, the message type and data to be retrieved for the service request;

retrieve, by the modified web browser extension, the data to be retrieved for the service request;

execute, by the modified web browser extension, a modified web browser extension content script that includes a plurality of actions based on the message type, wherein the plurality of actions includes interacting with at least one of the two applications of the plurality of applications; and transmit, by the modified web browser extension, through the modified web browser extension application interface, an event for execution to the web browser, wherein the event is based on the modified web browser extension content script to achieve the service request.

7. The system of claim 6 wherein the received message indicates a new application to be accessed.

8. The system of claim 6 wherein the message type is one of a plurality of predefined message types.

9. The system of claim 6 wherein the web browser further transmits a user profile and user preferences to the modified web browser extension.

10. The system of claim 6 wherein the processor is further configured to:

receive, by the modified web browser extension, a message from a user notification system to be transmitted to the web browser; and transmit, by the modified web browser extension, the message to all open webpages on the computing device, wherein each open webpage determines whether the message applies or not.

* * * * *